July 14, 1925.

G. W. STITZER

AUTOMOBILE HEADLIGHT

Filed Feb. 28, 1925

1,545,800

Inventor
George W. Stitzer.
By
Attorney

Patented July 14, 1925.

1,545,800

UNITED STATES PATENT OFFICE.

GEORGE W. STITZER, OF MAHANOY CITY, PENNSYLVANIA.

AUTOMOBILE HEADLIGHT.

Application filed February 28, 1925. Serial No. 12,415.

*To all whom it may concern:*

Be it known that I, GEORGE W. STITZER, a citizen of the United States, residing at Mahanoy City, in the county of Schuylkill, State of Pennsylvania, have invented certain new and useful Improvements in Automobile Headlights; and I do hereby declare the following to be a full, clear, and exact description of the invention, such as will enable others skilled in the art to which it appertains to make and use the same.

This invention relates to new and useful improvements in headlights, and particularly to headlights for automobiles, and like vehicles.

One object of the invention is to provide a headlight which includes a casing so constructed that the light rays will be directed onto the ground at the proper distance in front of the vehicle, and wherein the source of the light, within the casing, will not be seen by pedestrians, or the drivers of approaching vehicles.

Another object is to provide a device of this character which is simple in construction, effective in use, and which can be manufactured at a comparatively low cost.

Other objects and advantages will be apparent from the following description when taken in connection with the accompanying drawing.

Figure 1:
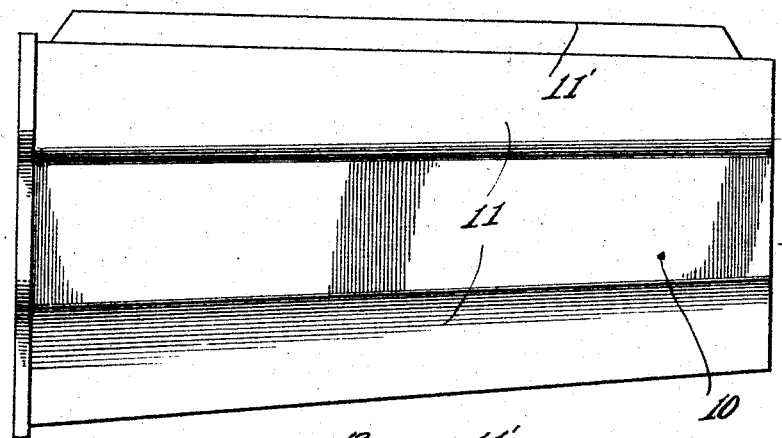
Figure 1 is a side elevation of a lamp casing made in accordance with the present invention.
Figure 2:
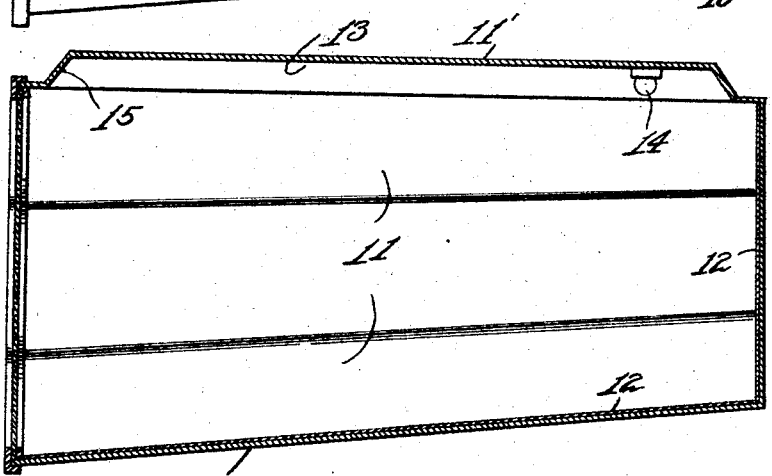
Figure 2 is a vertical longitudinal sectional view through the lamp casing.
Figure 3:
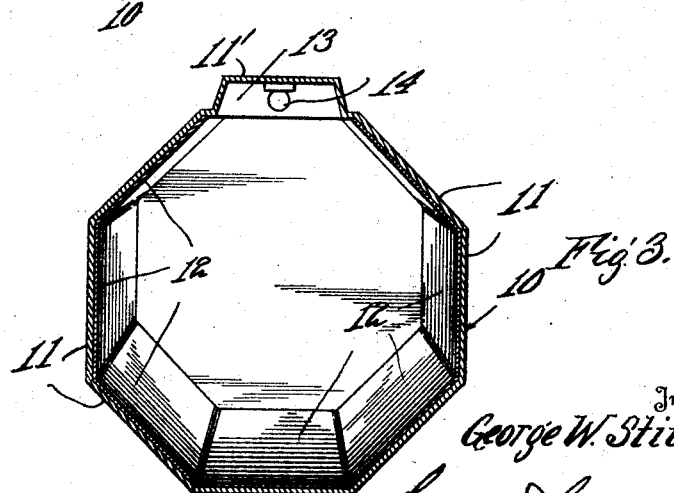
Figure 3 is a vertical transverse sectional view through the lamp casing.

Referring particularly to the accompanying drawing, there is shown a lamp casing, represented as a whole by the numeral 10, said casing being widest at its front end, and tapered toward the rear end thereof. The casing is made up of a series of flat walls 11, on the inner faces of which are formed reflecting surfaces 12, the casing shown in the accompanying drawing being octagonal in cross section.

The top wall 11' is raised and is formed with a recess 13 in its lower side, and mounted within this recess is the electric lamp 14.

It will be noted that the recess 13 extends throughout the entire length of the top wall, whereby a downwardly extending wall 15 is formed at the front end of the casing, which completely hides the electric lamp from the view of pedestrians or drivers. The light from the lamp is reflected forwardly and downwardly, onto the road surface, at the proper distance in front of the vehicle, whereby to effectively prevent any direct light rays shining into the eyes of pedestrians or drivers of approaching vehicles.

There is thus provided a head light casing for a vehicle which will produce the proper amount of light on the road, at the required distance ahead of the vehicle, but which will not rise to the height of the eyes of pedestrians or drivers of approaching vehicles.

What is claimed is:

A headlight casing comprising an elongated body having a plurality of flat walls and tapering toward one end, reflecting surfaces on the inner faces of the said flat walls, the uppermost of said flat walls having a longitudinal recess and a depending wall at the larger end of the body of the casing, and a source of light disposed within said recess and being hidden by said depending wall.

In testimony whereof, I affix my signature, in the presence of two witnesses.

GEORGE W. STITZER.

Witnesses:
H. MARK PARMLEY,
DONALD T. STITZER.